3,310,430
ELECTROLESS COPPER PLATING
Frederick W. Schneble, Jr., Oyster Bay, Rudolph J. Zeblisky, Roslyn Heights, John F. McCormack, Hauppauge, and John Duff Williamson, Miller Place, N.Y., assignors, by mesne assignments, to Day Company, N.V., a Curacao corporation
No Drawing. Filed June 30, 1965, Ser. No. 468,577
8 Claims. (Cl. 117—130)

This application is a continuation-in-part of co-pending application Ser. No. 288,618, filed June 18, 1963, now U.S. Patent No. 3,257,215 and Ser. No. 26,401, filed May 3, 1960 and now U.S. Patent 3,095,309, the specifications of which applications are hereby incorporated herein by reference.

The present invention relates to copper, and more particularly to electrolessly deposited copper having enhanced physical properties.

One object of the present invention is to provide electroless copper having a reduced hydrogen content.

Another object of this invention is to provide electroless copper which is bright and ductile.

Other objects of this invention will in part be obvious from the following description and will in part be made clear hereinafter.

Electroless copper solutions are capable of depositing copper without the assistance of an external supply of electrons. Typically, such solutions comprise water, a small amount of copper ions, e.g., a water soluble copper salt, a reducing agent for copper ions, a complexing agent for copper ions, and a pH regulator.

The selection of the water soluble copper salt for such baths is chiefly a matter of economics. Copper sulfate is preferred for economic reasons, but the halides, nitrate, acetate and other organic and inorganic acid salts of copper may also be used.

Rochelle salts, the sodium salts (mono-, di-, tri, and tetrasodium) salts of ethylenediaminetetraacetic acid, nitrilotriacetic acid and its alkali salts, gluconic acid, gluconates, and triethanolamine are preferred as copper ion complexing agents, but commercially available glucono-γ-lactone and modified ethylenediamineacetates are also useful, and in certain instances given even better results than the pure sodium ethylenediaminetetraacetates. One such material is N-hydroxyethylethylenediaminetriacetate. Other materials suitable for use as cupric complexing agents are disclosed in U.S. Patents Nos. 2,996,408, 3,075,856, 3,075,855 and 2,938,805.

Copper reducing agents which have been used in alkaline electroless metal baths include formaldehyde, and formaldehyde precursors or derivatives, such as paraformaldehyde, trioxane, dimethyl hydantoin, glyoxal, and the like. Also suitable as reducing agents in alkaline baths are borohydrides, such as alkali metal borohydrides, e.g., sodium and potassium borohydride, as well as substituted borohydrides, e.g., sodium trimethoxyborohydride. As reducing agents in such baths may also be used boranes, such as amine borane, e.g., isopropylamine borane, morpholine borane, and the like.

Typical of the copper reducing agents for use in acid electroless copper solutions are hypophosphites, such as sodium and potassium hypophosphite, and the like.

The pH adjustor or regulator may consist of any acid or base, and here again the selection will depend primarily on economics. For this reason, the pH adjustor on the alkaline side will ordinarily be sodium hydroxide. On the acid side, pH will usually be adjusted with an acid having a common anion with the copper salt. Since the preferred copper salt is the sulfate, the preferred pH adjustor on the acid side is the sulfuric acid.

In operation of the bath, the copper salt serves as a source of copper ions, and the reducing agent reduces the copper ions to metallic form. The reducing agent is itself oxidized to provide electrons for the reduction of the copper ions. The complexing agent serves to complex the copper ion so that it will not be precipitated, e.g., by hydroxyl ions and the like, and at the same time makes the copper available as needed to the reducing action of the reducing agent. The pH adjustor serves chiefly to regulate the internal plating potential of the bath.

It should be understood, however, that every constituent in the electroless copper bath has an effect on plating potential, and therefore must be regulated in concentration to maintain the most desirable plating potential for the particular ingredients and conditions of operation. Other factors which affect internal plating voltage, deposition quality and rate include temperature and degree of agitation, in addition to type and concentration of the basic ingredients mentioned.

In electroless plating baths, the bath constitutents are continuously being consumed, so that the bath is in a constant state of change. Control of such baths, so as to maintain a relatively high plating rate over relatively long periods of time is exceedingly difficult. As a result, such baths, and particularly those having a high plating potential, i.e., highly active baths, tend to become unstable and to spontaneously decompose with use.

Electroless copper solutions having the basic constituents described produce copper deposits which contain a substantial amount of included hydrogen. Such deposits are brittle, break under vibration and bending, and otherwise exhibit poor ductility. Such deposits also exhibit a dull surface, of poor color, which may best be described as "smutty."

The electroless copper of this invention, as distinguished from that of the prior art, has a greatly reduced hydrogen content, is bright, and possesses enhanced ductility, as compared to the electroless copper of the prior art.

Electroless copper having the unexpected characteristics described may be produced by maintaining in an electroless copper solution, particularly one having a high plating potential, an agent which prevents codeposition of hydrogen with copper. Although the theory of operation of such agents is not clearly understood, they may be said to poison the catalytic surface so as to promote the formation and release of hydrogen gas at the catalytic surface on which copper is depositing electrolessly, thereby inhibiting the inclusion of hydrogen in the deposit as it forms. Because of the functions described, the addition agents of this invention will sometimes be referred to as hydrogen inclusion retarding agents.

As disclosed in the cited co-pending applications, soluble cyanide compounds when present in the electroless copper solutions are capable of promoting formation and release of hydrogen as gas at the catalytic surface and are capable of simultaneously preventing or substantially reducing hydrogen inclusion at the catalytic interface on which copper is electrolessly depositing, and electroless copper produced from solutions containing water soluble cyanide compounds have a reduced hydrogen content and are bright and ductile. Typical of such water soluble cyanide compounds are alkali metal cyanides, such as sodium and potassium cyanide, and nitriles, such as alpha-hydroxynitrile, e.g., glycolnitrile and lactonitrile, and dinitriles, e.g., iminodiacetonitrile, and 3,3'-iminodipropionitrile. As brought out in the referred to co-pending application, such cyanide compounds may be present in units of between about 0.00002 and 0.06 mole/liter.

Hydrogen free electroless copper is also produced when the electroless copper solutions contain simple or complex compounds which comprise one or more of the elements vanadium, molybdenum, niobium, tungsten, rhenium, arsenic, antimony, bismuth, actinium, lanthanum, rare earths of both the lanthanum and actinium series, and mixtures of the foregoing.

Preferred for use are those compounds which consist of or comprise elements of the type described which have at least two oxidation states. In this preferred group are compounds comprising vanadium, niobium, molybdenum, tungsten, rhenium, arsenic, antimony, bismuth, cerium, praseodymium, neodymium, samarium, europium, terbium, thalium, ytterbium, protactinium, and uranium, including mixtures of the foregoing. These elements are preferably added to the electroless copper plating baths in a form such that the element is at its most stable valence state.

Especially suitable for use as the hydrogen inclusion retarding agents are cyanide and vanadium.

As the source of the hydrogen inclusion retarding agents may be used compounds which are soluble in the electroless copper baths.

Illustrative cyanide compounds have already been given.

Molybdenum may be supplied as molybdic trioxide, as well as water soluble organic and inorganic acid salts of molybdenum, as for example, alkali and alkaline earth metal, or ammonium molybdate. Suitable sources of tungsten, vanadium, rhenium and arsenic are the oxides of such elements, as well as organic and inorganic acid water soluble salts of such elements, e.g., the tungstates, vanadates, arsenates and rhenates of the metals of Groups I-A and II-A of the Periodic Table of Elements, and ammonium. Preferred for use are the sodium, potassium and ammonium salts. Sources of antimony, bismuth, lanthanum, actinium and rare earths are the oxides of such elements and water soluble organic and inorganic acid salts of such elements, including the sulfates, nitrates, halides, acetates, and the like.

The foregoing compounds are merely typical of those which are capable of providing hydrogen inclusion retarders of the type and form described.

The amount of the hydrogen inclusion retarding elements or radicals maintained in the baths will be a small effective amount. Ordinarily, their concentration will average between about 0.1 and 1000 microgram atoms of the element or radical per liter of solution, preferably between about 1 and 300 microgram atoms per liter. As used herein, a microgram atom is $1 \times 10^{-6}$ gram atom. For convenience of terminology, a microgram atom of cyanide (CN) will be considered herein as having an atom weight of 29, i.e., the sum of the atom weight of carbon (12) and nitrogen (17) making up the (CN) radical.

It should be emphasized however that the small effective amount of hydrogen inclusion retarding element or radical will vary with the nature and activity of the element or radical used, and with make-up of the solution and the conditions, e.g., temperature, under which is is used. The upper limit of the agent is an amount which will stop the bath, i.e., prevent autocatalytic deposition of cooper under conditions of use. The lower limit is the least amount of agent which will be effective in manifesting the results described herein, again under the particular conditions of use.

Here it should be noted that excess amounts of compounds comprising the elements described may stop the bath completely under certain conditions of use. So sensitive is the concentration on some of the elements that amounts measured in parts per million may stop the bath completely and practically instantaneously at a given activity level, as controlled by a given temperature and given reactant concentrations and types.

A typical electroless copper deposition bath made according to the present invention will comprise:

| | |
|---|---|
| Electroless metal salt | 0.002 to 0.60 moles. |
| Reducing agent | 0.03 to 1.3 moles. |
| Electroless metal complexing agent | 0.7 to 2.5 times the moles of copper. |
| Hydrogen inclusion retarding element or radical | 0.1 to 1000 mirco gram atoms. |
| pH adjustor | Sufficient to give desired pH. |
| Water | Sufficient to make 1 liter. |

Specific embodiments of a high plating potential solution comprise:

| | |
|---|---|
| Copper salt | 0.002 to 0.60 moles. |
| Formaldehyde | 0.03 to 1.3 moles. |
| Copper ion complexing agent | 0.7 to 2.5 times the moles of copper. |
| Hydrogen inclusion retarding element or radical | 0.1 to 1000 microgram atoms. |
| Alkali metal hydroxide | Sufficient to give pH of 10–14. |
| Water | Sufficient to make 1 liter. |

Preferred embodiment of highly active solutions comprise:

| | |
|---|---|
| A soluble cupric salt, preferably cupric sulfate moles | 0.002 to 0.2 |
| Alkali metal hydroxide, preferably sodium hydroxide, to give | pH of 10–14 |
| Formaldehyde | 0.06 to 0.50 |
| Cupric ion complexing agent | [1] |
| Sodium cyanide moles | .00005 to 0.01 |
| Water sufficient to make 1 liter. | |

[1] 0.001 to 0.60 mole (and usually at least about 10% molar excess based on the amount of cupric salt employed).

In considering the general and specific working formulae set forth herein, it should be understood that as the baths are used up in plating, the ingredients will be replenished from time to time. Also, it is advisable to monitor the pH, and the concentration of the hydrogen retarder, and to adjust them to their optimum value as the bath is used.

For best results, surfactants in an amount of less than about 5 grams per liter may be added to the baths. Typical of suitable surfactants are organic phosphate esters, and oxyethylated sodium salts.

The baths may be used at widely varying temperatures, e.g., between 15° and 100° C., although they will usually to be used between about 20° and 80° C. As the temperature is increased, it is usual to find that the rate of plating is increased, but the temperature is not highly critical and, within the usual operating range, excellent bright, ductile deposits of electroless copper of reduced hydrogen content are obtained.

Performance data for baths made in accordance with the teachings contained herein are given in Table I.

TABLE I

| CuSO₄·5H₂O (gm./l.) | Tetrasodium Ethylenediamine Tetraacetic Acid (gm./l.) | HCHO 37% (ml./l.) | V₂O₅ (gm./l.) | NaAsO₂ (gm./l.) | Potassium Antimony Tartrate (gm./l.) | Stability | Thickness of Deposit (Inch) | Ductility (Bends) |
|---|---|---|---|---|---|---|---|---|
| 15 | 40 | 6 | Control | | | Unstable | .00538 | 1.5 |
| 15 | 40 | 6 | .01 | | | Stable | .00022 | 4.5 |
| 15 | 40 | 6 | .02 | | | do | .00019 | 5 |
| 15 | 40 | 6 | .007 | | | do | .00025 | 5 |
| 15 | 40 | 6 | .005 | | | do | .00029 | 5 |
| 15 | 40 | 6 | .003 | | | do | .00036 | 5 |
| 15 | 40 | 6 | .001 | | | do | .00047 | 5 |
| 15 | 40 | 6 | | Control | | Unstable | .0004 | 1.5 |
| 15 | 40 | 6 | | 0.02 | | Stable | .00022 | 4.5 |
| 15 | 40 | 6 | | 0.01 | | do | .00035 | 5.5 |
| 15 | 40 | 6 | | 0.007 | | do | .00035 | 4 |
| 15 | 40 | 6 | .001 | | | do | .00025 | 4.5 |
| 15 | 40 | 6 | .007 | | | do | .00028 | 4 |
| 15 | 40 | 6 | .0005 | | | do | .00034 | 5.5 |
| 15 | 40 | 6 | | | Control 0.03 | Unstable | .00061 | 1.5 |
| 15 | 40 | 6 | | | | Stable | .00047 | 4.5 |

In Table I, the solutions were maintained at a pH of about 12 and at elevated temperature throughout use. In all instances about 1 ml./l. of an organic phosphate ester was used as a surfactant.

In Table I, ductility is measured by bending the copper deposit through 180°, in one direction, creasing, then returning it to its original position, with pressing along the crease to flatten it, this cycle constituting one bend.

As shown in Table I, the presence of the hydrogen retarding agents described herein enchances the ductility of the copper deposits to a truly remarkable degree.

Use of the agents described herein in autocatalytic copper solutions also improves stability to a marked degree, as is also brought out in Table I.

The ductile electroless metal of this invention, in addition to having a reduced hydrogen content, is characterized by the presence of one or more of the hydrogen retarding elements or radical described, i.e., cyanide, molybdenum, niobium, tungsten, rhenium, arsenic, antimony, bismuth, actinium, lanthanum and rare earths.

In using the autocatalytic or electroless copper solutions to plate metal, the surface to be plated must be free of grease and other contaminating material.

Where a non-metallic surface is to be plated, the surface area to receive the deposit must first be sensitized to render it catalytic to the reception of electroless copper, as by the well known treatment with an acidic aqueous solution of stannous chloride (SNCl₂), followed by treatment with a dilute aqueous acidic solution of palladium chloride (PdCl₂).

Alternatively, extremely good sensitization of non-metallic surfaces is achieved by contact with an acidic solution containing a mixture of stannous chloride and precious metal chloride, such as palladium chloride, the stannous chloride being present in stoichiometric excess, based on the amount of precious metal chloride.

Other ways of sensitizing non-metallic surfaces for reception of an electroless copper deposit from the baths described herein are disclosed in co-pending application Ser. No. 785,703, filed Jan. 8, 1959, assigned to applicants' common assignee and now abandoned.

Where metal surface is to be plated, it should be degreased, and then treated with an acid, such as hydrochloric or phosphoric acid, to free the surface of oxides.

Following pre-treatment and/or sensitization, the surface to be plated is immersed in the autocatalytic copper baths, and permitted to remain in the bath until a copper deposit of the desired thickness has been built up.

When ductile electroless copper by itself is desired, the deposit may be stripped from the surface by appropriate means.

The invention in its broadest aspects is not limited to the specific steps, processes and compositions shown and described but departures may be made therefrom within the scope of the accompanying claims without departing from the principles of the invention and without sacrificing its chief advantages.

What is claimed:

1. A new article of manufacture comprising a copper plating and a base, said copper plating consisting essentially of bright, ductile, electroless copper and containing a member selected from the group consisting of a water soluble cyanide compound, vanadium, molybdenum, niobium, tungsten, rhenium, arsenic, antimony, bismuth, rare earths of the actinium series, and rare earths of the lanthanum series, and mixtures of the foregoing.

2. A new article of manufacture comprising a copper plating and a base, said copper plating consisting essentially of bright, ductile, electroless copper characterized by high ductility of at least more than 1.5 bends.

3. A new article of manufacture comprising a copper plating on a base, said copper plating consisting essentially of bright, ductile, electroless copper characterized by high ductility of at least more than 1.5 bends and containing a hydrogen inclusion retarding agent for said copper wherein said hydrogen inclusion retarding agent is a member selected from the group consisting of a water soluble cyanide compound, vanadium, molybdenum, niobium, tungsten, rhenium, arsenic, antimony, bismuth, rare earths of the actinium series, and rare earths of the lanthanum series, and mixtures of the foregoing.

4. A new article of manufacture comprising a copper plating on a base, said copper plating consisting essentially of bright, ductile, electroless copper characterized by high ductility of at least more than 1.5 bends and containing a hydrogen inclusion retarding agent for said copper wherein said hydrogen inclusion retarding agent comprises a water soluble cyanide compound.

5. A new article of manufacture comprising a copper plating on a base, said copper plating consisting essentially of bright, ductile, electroless copper characterized by high ductility of at least more than 1.5 bends and containing a hydrogen inclusion retarding agent for said copper wherein said hydrogen inclusion retarding agent comprises arsenic.

6. A new article of manufacture comprising a copper plating on a base, said copper plating consisting essentially of bright, ductile, electroless copper characterized by high ductility of at least more than 1.5 bends and containing a hydrogen inclusion retarding agent for said copper wherein said hydrogen inclusion retarding agent comprises antimony.

7. A new article of manufacture comprising a copper plating and a base, said copper plating consisting esesntially of bright, ductile, electroless copper characterized by high ductility of at least more than 1.5 bends and containing a hydrogen inclusion retarding agent for said copper wherein said hydrogen inclusion retarding agent comprises vanadium.

8. A new article of manufacture comprising a copper plating on a non-metallic base sensitized to the reception of electroless copper, said copper plating consisting essentially of bright, ductile, electroless copper characterized by high ductility of at least more than 1.5 bends.

References Cited by the Examiner
UNITED STATES PATENTS

| | | | |
|---|---|---|---|
| 2,633,631 | 4/1953 | Horvitz. | |
| 2,876,116 | 3/1959 | Jendrazynski | 106—1 |
| 2,884,344 | 4/1959 | Ramirez | 106—1 |
| 2,933,422 | 4/1960 | Mason | 106—1 |
| 2,965,551 | 12/1960 | Richaud | 106—1 |
| 3,119,709 | 1/1964 | Atkinson | 106—1 |

ALEXANDER H. BRODMERKEL, *Primary Examiner.*

L. B. HAYES, *Assistant Examiner.*